C. E. MARCHAND.
Machines for Beading Sheet-Metal Ware.

No. 139,681. Patented June 10, 1873.

Witnesses.
S. V. Essick
C. F. Shem

Inventor:
C. E. Marchand

UNITED STATES PATENT OFFICE.

CHARLES E. MARCHAND, OF ALLIANCE, OHIO, ASSIGNOR OF ONE-HALF HIS RIGHT TO THOMAS R. MORGAN, OF SAME PLACE.

IMPROVEMENT IN MACHINES FOR BEADING SHEET-METAL WARE.

Specification forming part of Letters Patent No. 139,681, dated June 10, 1873; application filed April 11, 1872.

*To all whom it may concern:*

Be it known that I, C. E. MARCHAND, of Alliance, Ohio, have invented certain Improvements in Machines for Trimming and Beading Tin-Ware after it has been pressed into form, of which the following is a specification:

The first part of my invention relates to the use of the levers $a$ and $c$, by the use of which, with the rollers $e$, $d$, $v$, and $s$, the edges of tin pans, after they have been pressed into form, may be cut and beaded, giving the edges of the said pans strength and finish. The second part of my invention relates to the combination of the plate $m$ with the eccentric post $h$ and $q$.

Figure 1:
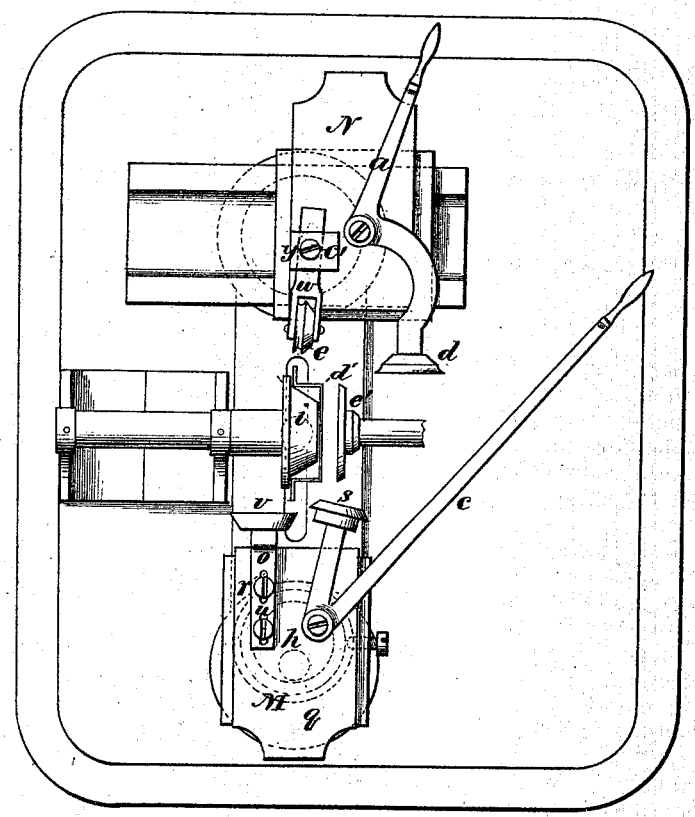
Figure 2:
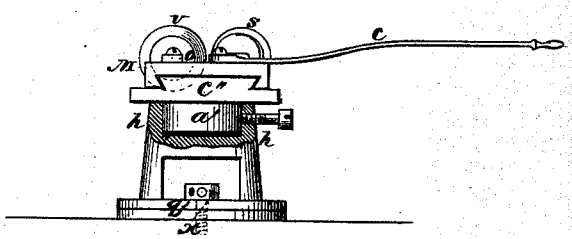

Figure 1 is a top view of my invention. Fig. 2 is a view of the eccentric post $h$ and $q$ with its part $c''$ and $a'$.

$a$ is a lever, which is used for moving the roller $d$ to connect with the roller $e$ for forming the edges of the pressed pan. $c$ is a lever by which the roller $s$ is moved to connect with the roller $v$ so that the edge of said pan may be cut preparatory to being formed by the rollers $e$ and $d$. $o$ and $w$ are pieces which hold the rollers $e$ and $v$. $i$ is the part which holds the pan $d'$ while it is being finished. $d'$ is the pan in process of being beaded. $e'$ is the part by which the pan $d'$ is pressed against the part $i$ while the work is being done on it. $h$ and $q$ are a post having a hole, $x$, in the center of the part $q$. $h$ is the upright part of the post, which is set to the side of the center of the part $q$, thus forming an eccentric for the purpose of moving the plate $m$ to or from the part $i$. $a'$ is a part which fits in the post $h$ $q$, the top $c''$ of which is a slide, to which the plate $m$ is attached. The part $o$ which holds the roller $v$ is made with oblong holes $r$ and $u$, for the purpose of adjusting it to suit the roller $s$, for the purpose of shearing the edges of the pan. $y$ is a clamp for holding the piece $w$, the said piece being held more directly by the set-screw $c'$.

What I claim as my invention, and desire to secure by Letters Patent, is—

1. The combination of the eccentric post $h$ $q$ with the plate $m$.
2. The combination of the levers $a$ and $c$, the rollers $e$, $d$, $v$, and $s$, the parts $o$ and $w$, and the parts $i$ and $e'$, for the purpose herein set forth.

C. E. MARCHAND.

Witnesses:
S. V. ESSICK,
C. F. SHEM.